C. R. PROTZE.
PROCESS FOR PRODUCING IMITATION SABLE FUR.
APPLICATION FILED AUG. 18, 1911.

1,059,760. Patented Apr. 22, 1913.

WITNESSES:
Robt R. Abbott
E. M. Juke

INVENTOR
Charles R. Protze
BY
H. T. Criswell
ATTORNEY

UNITED STATES PATENT OFFICE.

CHARLES R. PROTZE, OF WEST BROOKVILLE, NEW YORK.

PROCESS FOR PRODUCING IMITATION SABLE-FUR.

1,059,760.

Specification of Letters Patent.

Patented Apr. 22, 1913.

Application filed August 18, 1911. Serial No. 644,797.

*To all whom it may concern:*

Be it known that I, CHARLES R. PROTZE, a citizen of the United States, and a resident of West Brookville, county of Sullivan, and State of New York, have invented a certain new and useful Improvement in Processes for Producing Imitation Sable-Fur, of which the following is a full, clear, and exact specification.

This invention relates to a process for changing the appearance of an inexpensive class of furs to imitate a more expensive fur of an animal, and has for its object primarily to provide for dyeing and manipulating dressed American opossum skins in a manner to so clearly resemble dressed sable fur that the imitation fur may be used at a great saving of expense for making garments and trimmings for clothing which will display the richness and attractiveness of genuine sable. With these and other objects in view the invention will be hereinafter more particularly described with reference to the accompanying drawing, which forms a part of this specification, and will then be pointed out in the claim at the end of the description.

Figure 1:
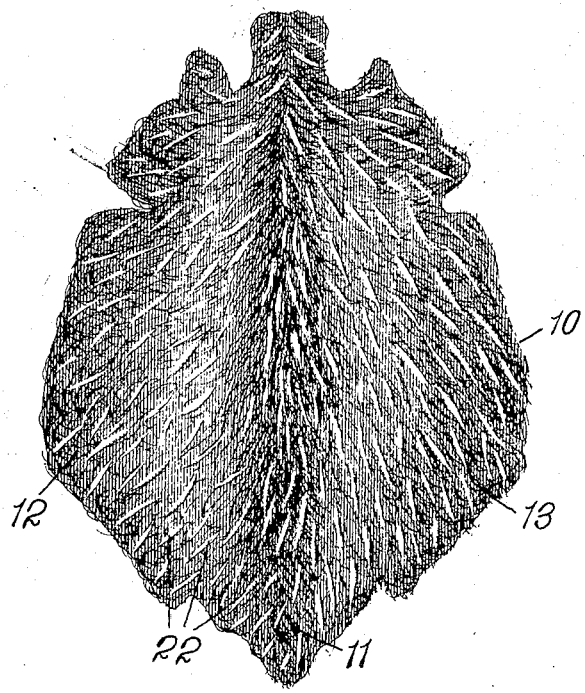
Figure 2:
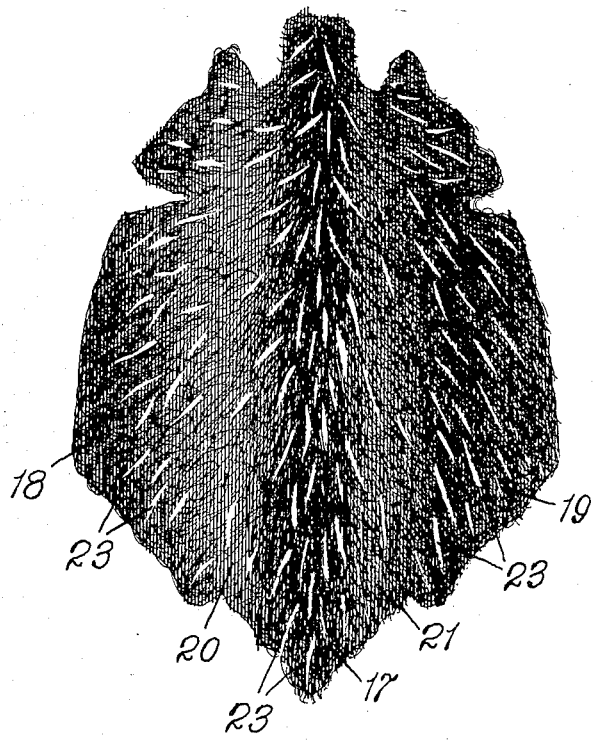

In the drawing, Figure 1 is a top view of a dressed American opossum fur skin, and Fig. 2 is a top view of said opossum skin when dyed and made to represent sable fur.

In carrying out the invention I use dressed American opossum skins or fur pelts, as 10, of preferably the best quality which are provided with a close "pile" or coat of fine soft fur interspersed with long hair. I also prefer to use dressed opossum skins which have a dark stripe 11, Fig. 1, through the center from the head to the tail and which have dark marginal shadings 12 and 13 at the lengthwise edges thereof.

The dressed fur skin is first cleansed of all excess grease and foreign substances by washing the skin with soap and caustic soda, or other suitable alkali, by any of the usual methods known in the art. The fur skin is then subjected to a bath of a solution of alum, or other alkaline earths, of medium strength whereby all fatty acids are removed therefrom, and the fur is "killed" so as to be susceptible of properly taking the dye. When the dressed American opossum fur is dried after being thus treated it is immersed and allowed to remain for a period from four to twelve hours in a vat containing a solution of a suitable coloring matter or pigment so as to produce a blue-gray shading effect to the fur, as shown in Fig. 2, which is characteristic of genuine sable fur. For this purpose I prefer to employ a transparent vegetable dye, and particularly a dye well known as ursol which serves to shade the dark stripes, of the fur to a rich blue-gray color, as shown at 17, 18, 19, at the same time tinting the white hairs 20 and 21 of the fur between the stripes 17, 18, 19, into merging light-shades of the same color. The dyed dressed opossum skin is subsequently dried and cleaned by the usual method of using sawdust, and the color-effect of genuine sable fur will thereby be produced.

The genuine sable fur has a distinctive feature in that the blue-gray central stripe and often the dark shadings thereof are interspersed with long hairs which I have observed as practically identical in arrangement, length and color to the dyed American opossum skin, as above described, the difference being that the opossum skin has a close coat of the long hair, as 22, Fig. 1, interspersed among the fine soft fur substantially over the entire skin. In order to imitate the genuine sable fur in this respect I remove from the dyed opossum fur pelt a suitable portion of the long hairs 22 thereof. The usual or any preferred means, for instance the use of sand paper and a knife blade, may be employed for extracting the long hairs, but care must be exercised in removing the long hairs from the light-shades of the dyed opossum skin so that a proper proportion of said long hairs, as 23, will remain interspersed in the blue-gray central stripes 17 or in said stripe as well as in the dark marginal shadings 18 and 19 of the dyed fur. In instances where the coat of long hair is too thick upon the dyed opossum skin a portion of the long hairs may also be extracted from the blue-gray central stripe 17 or the long hair in the shadings, or both may be removed, in order to vary its appearance as occasion requires.

In the foregoing description I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope thereof.

Having thus described my invention, I claim as new and desire to secure by Letters Patent:—

The process of producing imitation sable fur, which consists in subjecting a dressed American opossum fur skin having a dark central stripe and dark marginal shadings of soft dark fur and having long white hairs interspersed through said dark fur to a solution of vegetable dye for dyeing the fur varied blue-gray merging tints; and then removing only a part of said long white hairs.

This specification signed and witnessed this seventeenth day of August A. D. 1911.

CHARLES R. PROTZE.

Witnesses:
ROBT. B. ABBOTT,
E. M. JESKE.